No. 865,825. PATENTED SEPT. 10, 1907.
A. THOMPSON & G. P. LABEREE.
GANG PLOW.
APPLICATION FILED MAR. 23, 1907.

4 SHEETS—SHEET 1.

WITNESSES
INVENTORS
Amon Thompson
George P. Laberee
BY
Munn & Co
ATTORNEYS

No. 865,825. PATENTED SEPT. 10, 1907.
A. THOMPSON & G. P. LABEREE.
GANG PLOW.
APPLICATION FILED MAR. 23, 1907.

4 SHEETS—SHEET 2.

WITNESSES
Geo. W. Naylor
John K. Brachvogel

INVENTORS
Amon Thompson
George P. Laberee
BY
Munn & Co.
ATTORNEYS

No. 865,825. PATENTED SEPT. 10, 1907.
A. THOMPSON & G. P. LABEREE.
GANG PLOW.
APPLICATION FILED MAR. 23, 1907.

4 SHEETS—SHEET 3.

WITNESSES
Geo W. Taylor.
John K. Brachvogel

INVENTORS
Amon Thompson
George P. Laberee
BY Munn & Co
ATTORNEYS

No. 865,825. PATENTED SEPT. 10, 1907.
A. THOMPSON & G. P. LABEREE.
GANG PLOW.
APPLICATION FILED MAR. 23, 1907.

4 SHEETS—SHEET 4.

WITNESSES

INVENTORS
Amon Thompson
George P. Laberee
BY Munn & Co
ATTORNEYS

UNITED STATES PATENT OFFICE.

AMON THOMPSON AND GEORGE P. LABEREE, OF SALEM, OREGON.

GANG-PLOW.

No. 865,825.          Specification of Letters Patent.          Patented Sept. 10, 1907.

Application filed March 23, 1907. Serial No. 364,103.

*To all whom it may concern:*

Be it known that we, AMON THOMPSON and GEORGE P. LABEREE, both citizens of the United States, and residents of Salem, in the county of Marion and State of Oregon, have invented a new and Improved Gang-Plow, of which the following is a full, clear, and exact description.

This invention relates to gang plows and is particularly useful in connection with devices of this character drawn by means of traction engines and the like.

The object of the invention is to provide a gang plow having a plurality of plow shares for the purpose of plowing a number of furrows simultaneously, and having means for automatically raising the plows from contact with the ground when necessary.

A further object of the invention is to provide special steering means whereby the device possesses added facility of operation in guiding it when in use.

A still further object of the invention is to provide in a gang plow, a traction member and a trailer carrying the plows, the traction member and the trailer being provided with independent guide-wheels adapted to be simultaneously controlled.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1:
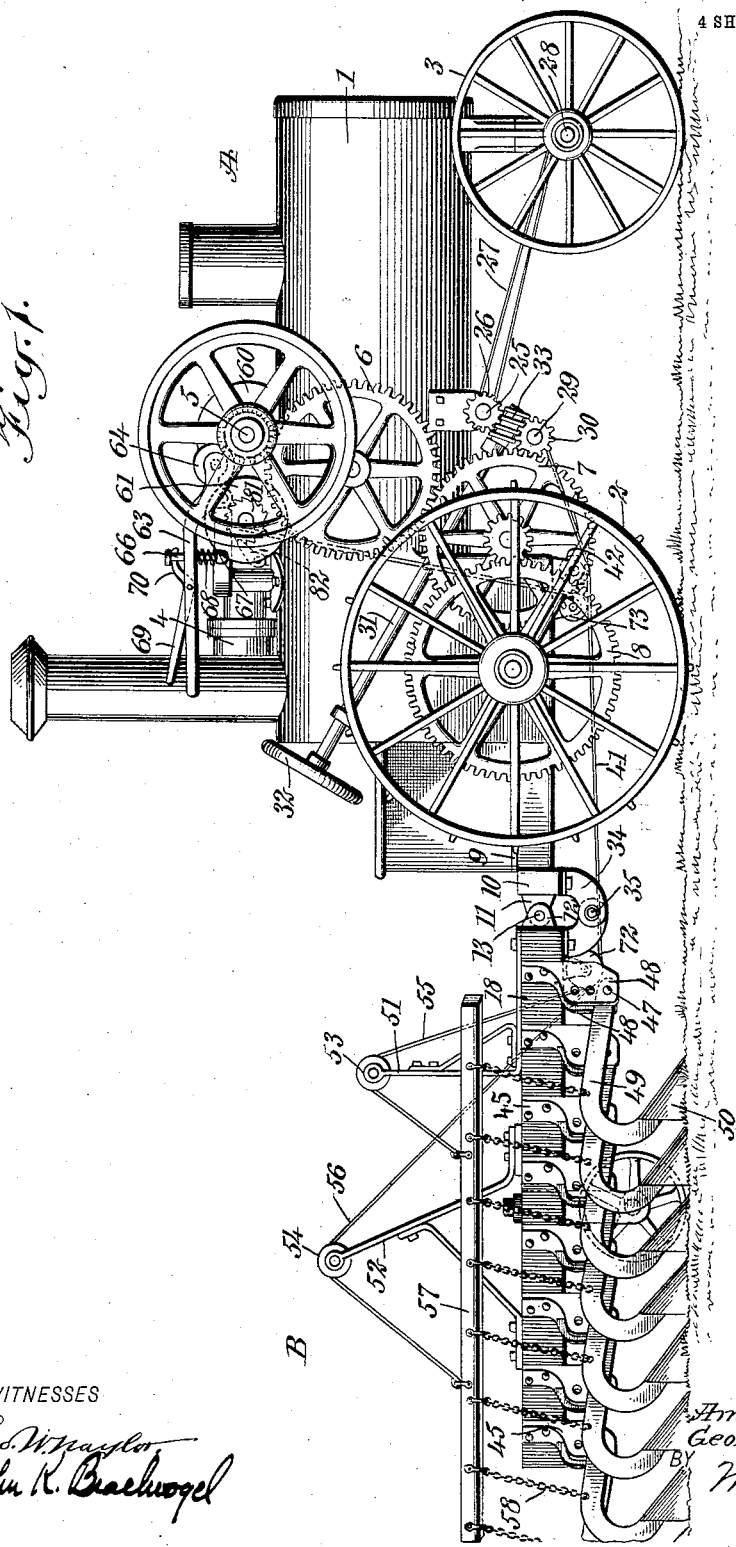
Figure 2:
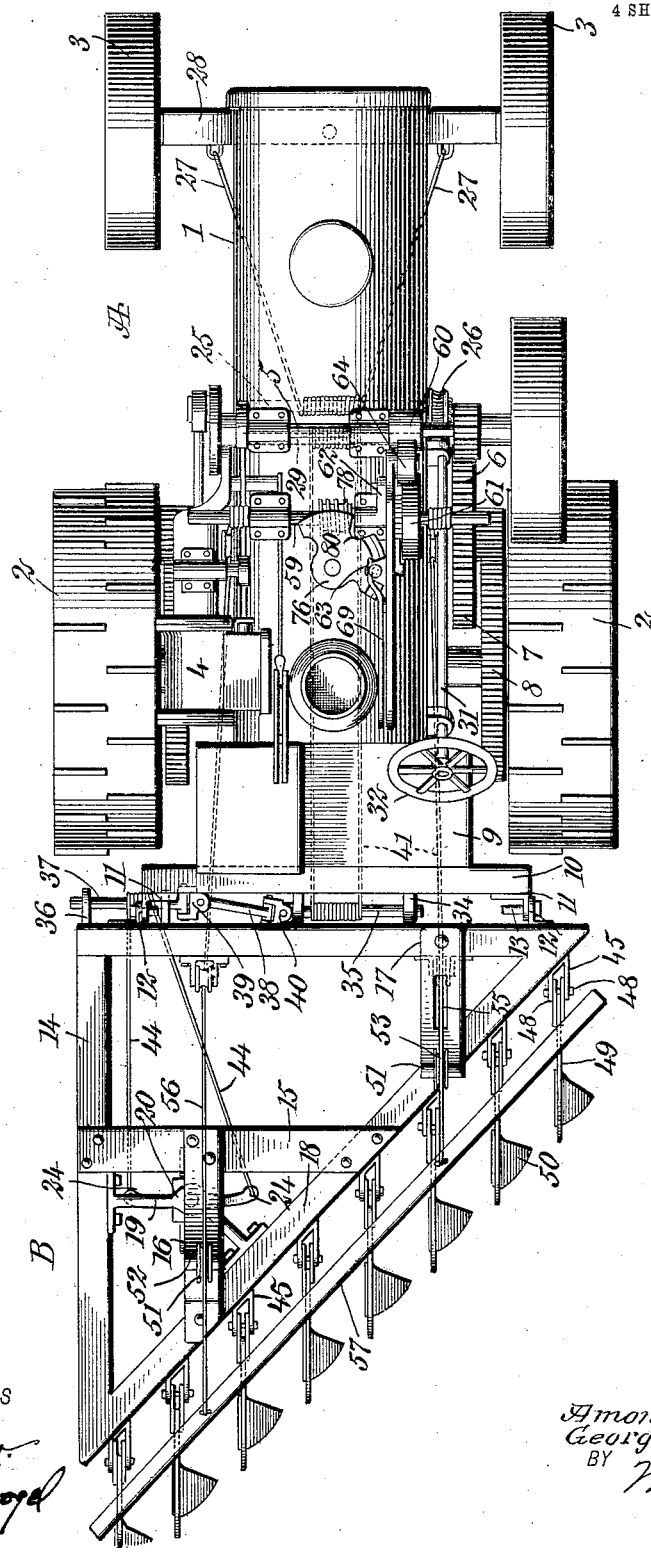
Figure 3:
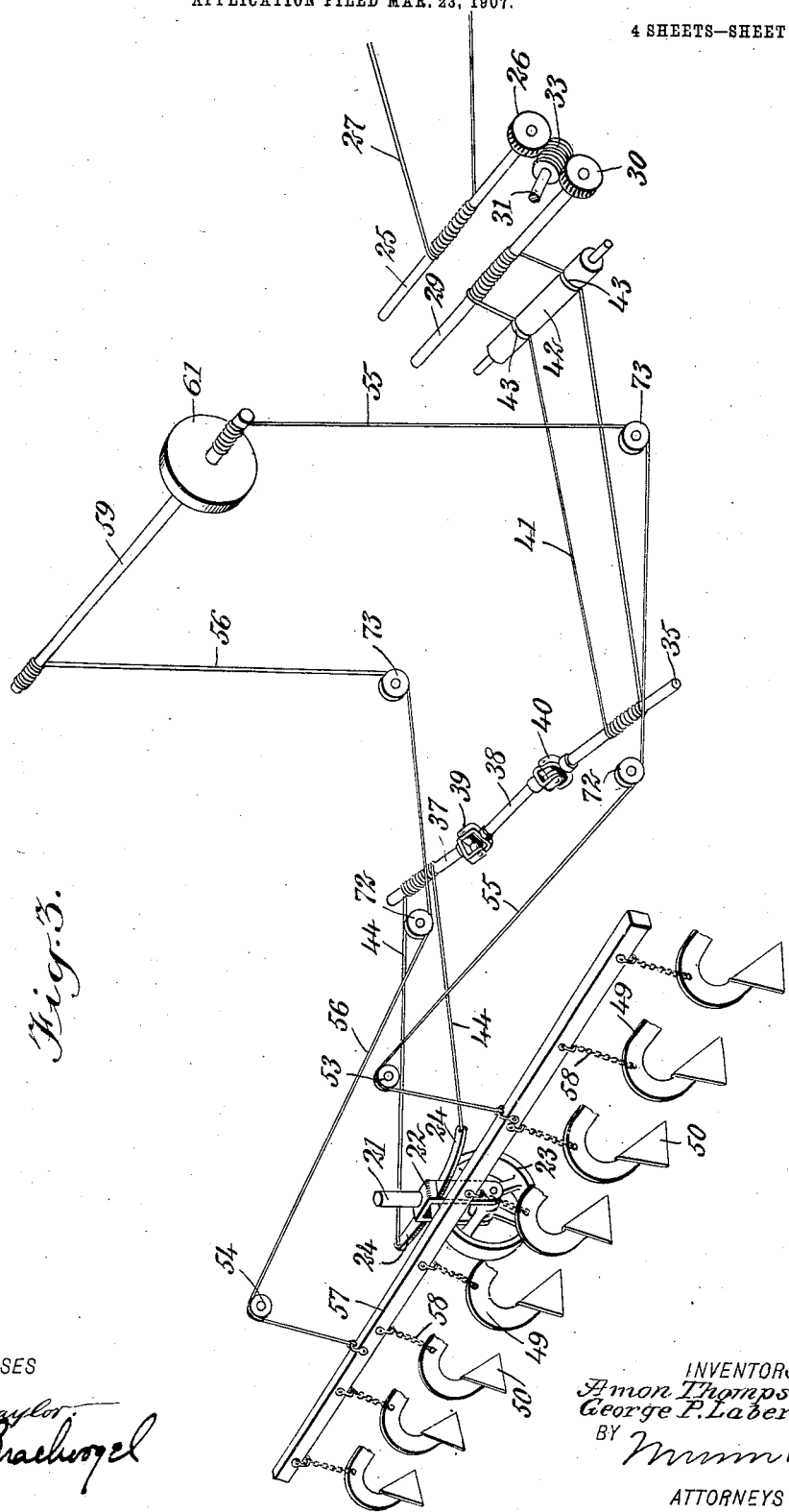
Figure 4:
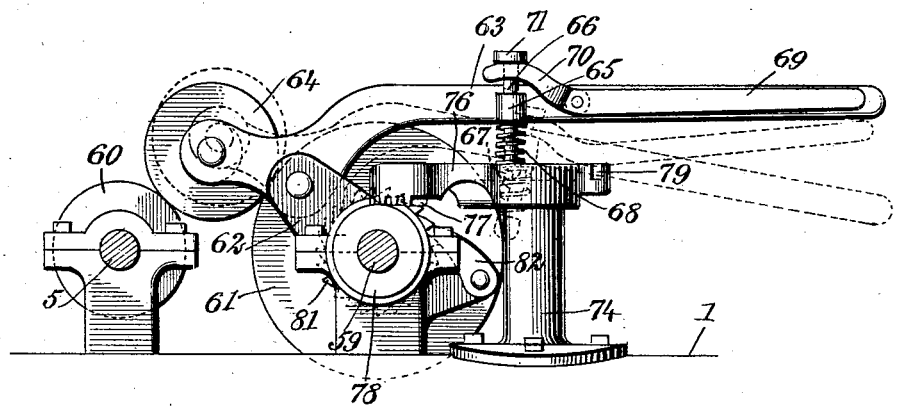
Figure 5:
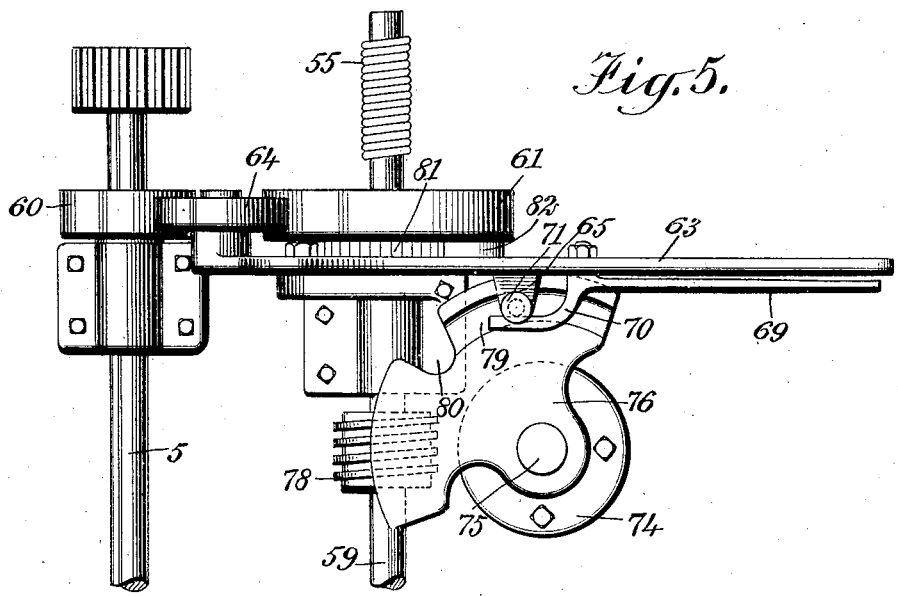

Figure 1 is a side elevation of our invention; Fig. 2 is a plan view of our invention; Fig. 3 is a diagrammatic perspective view of certain of the operative parts showing their proper correlation; Fig. 4 is an enlarged side elevation of a detail; and Fig. 5 is an enlarged plan view of the same detail.

Before proceeding to a more detailed explanation of our invention, it should be understood that it is customary, at the present time, to use gang plows drawn by traction engines operated by steam, gasolene or the like, which are adapted for cutting a plurality of furrows according to the number of plow shares with which they are provided. Furthermore, it is usual so to arrange these plow shares that they may be raised, lowered, or otherwise adjusted, as the necessity of operation dictates.

In our device each plow share is rigidly mounted upon an independent plow beam which is pivoted to swing in a substantially vertical plane independent of the remaining plow shares. These are all flexibly secured to a common lifting beam which is adapted to be automatically elevated from the traction member, while at the same time the flexible method of securing the plow beams permits independent movements of the separate plow shares due to irregularities and the like in the ground.

To facilitate the handling of our gang plow the traction member is provided with guide-wheels controlled by the usual means. At the same time the trailer is provided with a trailer-wheel adapted to assist in governing the direction of its movements, and this trailer-wheel is adapted to be simultaneously controlled with the guide-wheels of the traction member.

Referring more particularly to the drawings, the traction member A may consist of the ordinary steam traction engine in general use for similar purposes, or may consist of a special motor driven by an internal combustion engine or by any other means. Preferably the traction member is of the usual steam type, as shown in Figs. 1 and 2, and comprises a horizontal boiler 1 carried by a pair of driving-wheels 2 and a pair of guide-wheels 3.

Mounted upon the boiler is a cylinder 4 of ordinary construction and operating a driving-shaft 5 through a piston, connecting-rod and crank. The driving-shaft 5 actuates the driving-wheels 2 through a series of gears 6, 7 and 8.

At the rear of the boiler is a platform 9 for the operator. At the end of the platform 9 is a transverse beam 10 having hinge extensions 11 to which are pivoted similar hinge extensions 12 by means of hinge pins 13. The hinge extensions 12 are rigid with the trailer frame of a trailer B. The trailer B is preferably in the form of a right-triangle with one leg mounted adjacent to the transverse beam 10 of the traction member, the side corresponding to the hypotenuse carrying the plow shares, as will appear hereinafter. The framework may be of any suitable material, such as iron or wood, and is suitably braced by cross pieces 15, 16 and 17.

Rigidly secured to the sides 14 and 18 of the trailer frame is a wheel bracket 19 having a vertical socket 20. Within the socket 20 is pivotally mounted a pin 21 carrying at its lower extremity a fork 22 between the arms of which is rotatably mounted a trailer-wheel 23, as is shown most clearly in Fig. 3.

Projecting laterally from the fork 22 are guide arms 23 by means of which the trailer-wheel may be turned about a substantially vertical axis to assist in guiding the trailer, as will appear more clearly hereinafter.

The guide-wheels 3 of the traction member A are mounted in the usual manner upon an axle 28 adapted to be pivoted about a substantially vertical axis to guide the traction member.

Rotatably secured to the under side of the boiler 1 is a transverse shaft 25 having at one extremity a gear wheel 26. A flexible member 27, such as a cord or a chain, is wound about the shaft 25 and has its ends secured respectively near opposite ends of the axle 28 of the guide wheels. Thus, as the shaft 25 is turned, one end of the flexible member 27 is shortened and the other end is lengthened, thereby rotating the guide wheels about a vertical axis. Near the shaft 25 is a second similar shaft 29 having a similar gear wheel 30 at an end.

A steering shaft 31 is rotatably mounted at the side of the boiler carrying at an end adjacent to the platform 9 a hand-wheel 32, and having at its opposite end a worm-wheel 33 in mesh with both of the gear wheels 26 and 30, whereby both the shafts 25 and 29 can be simultaneously operated by the movement of the shaft 31 controlled by the operator on the platform 9 through the hand-wheel 32.

The transverse beam 10 has bearing brackets 34 extending therebelow, within which is rotatably mounted a shaft 35. The side of the trailer frame adjacent to the beam 10 has similar bearing brackets 36 within which is rotatably mounted a similar shaft 37. Connecting the shafts 35 and 37 is a third shaft 38 secured to the other shafts by means of universal joints 39 and 40. It will be understood that owing to irregularities of the ground, or for other reasons, the trailer frame would swing up or down about its hinge connection with the traction member, and that consequently the relative positions of the shafts 35 and 37 would be constantly changing. By means of this flexible connection between said shafts, the freedom of relative movement of the trailer and the traction member is in no way influenced or hampered, while a movement of the shaft 36 upon the traction member A is freely transmitted to the shaft 37 upon the trailer B.

An endless flexible member 41, such as a cord or chain, is wound about the shaft 35 passing over a guide roller 42 having guide grooves 43, to the shaft 29 about which it is wound in the reverse direction, as appears most clearly in Fig. 3. Consequently the revolution of the shaft 29 in one direction or the other is transmitted to the shaft 35 which moves in a similar direction, and in turn transmits its movement to the shaft 37. Wound about the shaft 37 is a flexible member 44 having its ends respectively secured to opposite ends of the arms 24 of the trailer wheel 23, whereby the revolution of the shaft 37 is transmitted to the trailer wheel as a movement of rotation of the same about a vertical axis, whereby the trailer member is guided in one direction or the other. The arrangement of the shafts and flexible members is such that as the guide wheels of the traction member are turned in one direction, the trailer wheel is turned in a similar direction, whereby as will be clearly understood, the guiding of the entire device is greatly simplified and assisted.

The side 18 of the trailer frame, corresponding to the hypotenuse of a right-angle triangle, is provided with a plurality of sockets 45 rigid with the side 18. The sockets 45 are provided with a plurality of openings 47 in the sides 48 thereof. Between the sides 48 are pivoted the plow beams 49, by means of pivot pins located in the openings 47. By thus having a plurality of openings 47, it is possible to adjust the pivoting points of the plow beams as desired. The plow beams 49 have their ends curved downward and backward, as is shown most clearly in Fig. 1. Secured to the curved ends in the usual manner by riveting or in any other suitable way are the plow shares 50. The trailer frame carries upon its upper side, brackets 51 and 52 having grooved guide-wheels 53 and 54 at their upper ends over which pass flexible members 55 and 56, comprising cords, chains or the like. The flexible members carry a lifting beam 57 substantially parallel with the side 18 of the trailer frame and free to move in an upward or downward direction. The lifting beam 57 is provided with a plurality of chains 58 which are secured at their lower ends to the plow beams 49 whereby, as the lifting beam 57 is raised, all the plow beams are similarly elevated.

Rotatably mounted upon the traction member adjacent and parallel to the driving-shaft 5 is a second shaft 59 having near one end a friction disk 61 in same relative position as the friction disk 60 on the driving shaft 5. Pivotally mounted in a bracket 62 is a hand lever 63 carrying, at one end, a rotatable friction pulley 64 adapted to engage with both friction disks 60 and 61 to transmit the revolution of the driving shaft 5 to the second shaft 59. Slidably mounted in a lateral extension 65 of the hand lever 63 is a spring pin 66 having a head 67, and between the head 67 and the extension 65 a helical spring 68 adapted normally to force the spring pin downward from the lever 63. An arm 69 is pivoted to the side of the hand lever 63, and has an offset 70 engaging with the under side of a shoulder 71 formed at the upper end of the spring pin 66 whereby the spring pin may be forced upward through the extension 65 when the arm 69 is forced downward against the tension of the spring 68. The ends of the shaft 59 extend laterally beyond the bearings in which it is mounted and have wound upon them respectively the ends of the flexible members 55 and 56. It will be understood that if the shaft 59 is turned, the flexible members are correspondingly wound or unwound thereupon, either raising or lowering the plows on the trailer through the lifting beam 57, the flexible members passing under the trailer frame and the traction member over suitable grooved guide-wheels 72 and 73.

Secured to the traction member near the shaft 59 is a vertical bearing 74 carrying a pivot pin 75 to which is secured a block 76 adapted to be rotated in a horizontal plane. At its under side the block 76 carries an integral rack section 77 adapted to engage with a worm-wheel 78 upon the shaft 59, whereby, as the shaft is revolved, the block 76 is rotated in a substantially horizontal plane. The block 76 has a curved groove 79 adapted to receive the head 67 of the spring pin 66. When the head of the pin rests normally in the groove 79, the friction pulley 64 is in engagement with the friction disks 60 and 61 whereby the revolution of the driving shafts is transmitted to the second shaft 59. The movement of the second shaft 59 turns the block 76 about the pivot pin 75, the head 67 of the pin 66 sliding in the groove 79 until a recess 80, formed in the side of the block 76, is reached, whereupon the pin 66 slips into this recess and allows the pulley 64 to pivot out of contact with the friction disk 60. When this occurs, the movement of the shaft 59 naturally ceases. The arrangement is such that the revolution of the shaft 59, when actuated by the driving shaft 5 through the friction pulley 64, winds the flexible members upon the shaft 59 thereby raising the plows, the plows being clear of the ground when the recess 80 advances sufficiently to permit the pin 66 to slip therethrough to release the pulley 64 from engagement with the disk 60. Upon the shaft 59 is a ratchet 81 with which engages a pawl 82 which holds the shaft 59 in a fixed position to prevent the weight of the plows from unwinding the flexible members from the shaft when it is no longer driven by the pulley 64. However, when it is desired to place the plows again in contact with the ground, the hand lever 63 is raised and the pawl 82 removed from engagement with the ratchet 81 whereupon the weight of the plows themselves pulling upon the flexible members 55 and 56 unwinds the same from the shaft 59 and the plows return to the ground. The reverse revolution of the shaft 59 rotates the block 76 in the reverse direction, the groove 79 passing under the pin 66 and therebeyond. When it is again desired to raise the plows, the lever 63 is raised, its weight tending normally to keep the friction pulley clear of the friction disk 60 until the pulley 64 again engages the disk 60, whereupon the shaft 59 is actuated to wind up the flexible members.

Having thus described our invention, we claim as new and desire to secure by Letters Patent:

1. In a gang plow, in combination, a traction member having a guide-wheel, a trailer hinged to said traction member, said trailer having a trailer-wheel, and means for simultaneously rotating said wheels about a substantially vertical axis to change the direction of travel of the plow.

2. In a gang plow, in combination, a traction member having a guide-wheel, a trailer secured to said traction member and free to swing in a direction substantially perpendicular to the ground, said trailer having a trailer-wheel, and means for simultaneously rotating said wheels about a substantially vertical axis to change the direction of travel of the plow.

3. In a gang plow, in combination, a traction member having guide-wheels, a trailer having plows and a trailer-wheel, means for raising said plows from contact with the ground, and means for simultaneously rotating said wheels about a substantially vertical axis to change the direction of travel of the plow.

4. In a gang plow, a traction member having guide-wheels, a trailer hinged to said member and having plows and a trailer wheel, a shaft adapted to rotate said guide-wheels about a substantially vertical axis, a second shaft adapted to rotate said trailer-wheel about a substantially vertical axis, and means for simultaneously controlling said shafts.

5. In a gang plow, a traction member having guide-wheels, a trailer hinged to said member and having plows and a traction wheel, a shaft adapted to rotate said guide-wheels about a substantially vertical axis, a second shaft adapted to rotate said trailer-wheel about a substantially vertical axis, and means common to said shafts for revolving the same.

6. In a gang plow, a traction member having guide-wheels, a trailer hinged to said member and having a trailer-wheel, a shaft having a flexible member wound thereupon and adapted to rotate said guide-wheels about a substantially vertical axis when said shaft is actuated, a second shaft having a flexible member wound thereupon and adapted to rotate said trailer-wheel about a substantially vertical axis when said second shaft is actuated, and means for simultaneously actuating said shafts.

7. In a gang plow, a traction member having a trailer hinged thereto and provided with plows and a trailer-wheel, a flexible shaft mounted upon said traction member and upon said trailer and adapted to rotate said trailer-wheel about a substantially vertical axis, and means for controlling said shaft from said traction member.

8. In a gang plow, a traction member having a trailer hinged thereto and provided with plows and a trailer-wheel, a shaft mounted upon said traction member, a second shaft mounted upon said trailer, said shafts having a flexible connection and being adapted to rotate said trailer-wheel about a substantially vertical axis, and means for controlling said shafts from said traction member.

9. In a gang plow, a traction member, a trailer hinged to said traction member and having plows and a trailer-wheel, a shaft mounted upon said traction member, a second shaft mounted upon said trailer, a flexible connection between said shafts, and means for actuating said first shaft, said second shaft being adapted to rotate said trailer-wheel about a substantially vertical axis to change the direction of travel of said trailer.

10. In a gang plow, a traction member having guide-wheels, a trailer hinged to said member and having plows and a trailer-wheel, a flexible shaft having an end mounted upon said traction member and an end mounted upon said trailer and adapted to rotate said trailer-wheel about a substantially vertical axis, a shaft adapted to rotate said guide-wheels about a substantially vertical axis, and means for simultaneously controlling said shafts.

11. In a gang plow a traction member having guide-wheels, a trailer hinged to said member and having plows and a trailer-wheel, a shaft mounted upon said member, a second shaft mounted upon said trailer, a universal joint connection between said shafts, a flexible member secured to said second shaft and said trailer-wheel and adapted to control said trailer-wheel through the revolution of said second shaft, and means for simultaneously controlling said shaft of said traction member and said guide-wheels.

12. In a gang plow, a traction member having guide-wheels, a trailer hinged to said member and having plows, a bracket upon said trailer having a vertical socket, a pin in said socket having a fork and lateral arms, a trailer-wheel pivotally mounted within said fork, a shaft mounted upon said member, a second shaft mounted upon said trailer, a universal joint connection between said shafts, a flexible member having the ends secured to said arms and wound about said second shaft, and means for simultaneously controlling said shaft of said traction member and said guide-wheels.

13. In a gang plow, a traction member having guide-wheels, a trailer hinged to said member and having plows and a trailer-wheel, a shaft mounted upon said member and having a gear wheel, a second shaft mounted upon said member and having a gear wheel, a worm in engagement with said gear wheels and adapted to be manually operated, and a flexible shaft mounted upon said member and upon said trailer and adapted to control said trailer-wheel, said first shaft being adapted to control said guide-wheels, said second shaft being adapted to control said flexible shaft.

14. In a gang plow, a traction member having guide-wheels, a trailer hinged to said member and having plows and a trailer-wheel, a flexible shaft having an end mounted upon said member and an end mounted upon said trailer, a flexible member secured to said flexible shaft near the end mounted upon said trailer and to said trailer-wheel and adapted to control said trailer-wheel by the revolution of said flexible shaft, a shaft mounted upon said member and having a gear wheel, a second shaft mounted upon said member and having a gear wheel, a worm in engagement with said gear wheels and adapted to be manually operated, a second flexible member secured to one of said shafts and to said guide-wheels to control the same, and a further flexible member secured to said second shaft and to said flexible shaft to control the latter.

15. In a gang plow, a traction member having guide-wheels, a trailer hinged to said member and having plows, a flexible shaft having an end mounted upon said member and an end mounted upon said trailer, said trailer having a bracket provided with a socket, a vertical pin in said socket having a fork and arms, a trailer-wheel rotatably mounted in said fork, a flexible member secured to said flexible shaft near the end mounted upon said trailer, and to said arms to control said trailer-wheel, a shaft mounted upon said member and having a gear wheel, a second shaft mounted upon said member and having a gear wheel, a worm in engagement with said gear wheel and adapted to be manually operated, a second flexible member secured to said shaft of said member and said guide-wheels to control the same, and a further flexible member secured to said second shaft and to said flexible shaft at the end mounted upon said member to control said second shaft.

16. In a gang plow, a traction member having guide-wheels and driving-wheels, actuating means for said driving-wheels, a trailer having plows and a trailer-wheel, means for simultaneously controlling said guide-wheels and said trailer-wheels, and means operated by said actuating means of said traction member for raising said plows from contact with the ground.

17. In a gang plow, a traction member having guide-wheels and driving-wheels, actuating means for said driving-wheels, a trailer hinged to said member and having adjustable plows and a trailer-wheel, means for simultaneously controlling said guide-wheels and said trailer-wheels, a shaft having a flexible member wound thereupon and controlling said plows, said flexible member being adapted to raise the plows from contact with the ground through the revolution of said shaft, and means for revolving said shaft through said actuating means of said traction member.

18. In a gang plow, a traction member having guide-wheels and driving-wheels, a trailer hinged to said traction member and having plows adjustable in a substantially vertical plane, and a trailer wheel, actuating means for said driving-wheels, a shaft having a flexible member wound thereupon and adapted to adjust said plows through the revolution of said shaft, means for holding said shaft in a fixed position, a flexible shaft mounted upon said traction member and upon said trailer, and adapted to control said trailer-wheel, and means for simultaneously controlling said flexible shaft and said guide-wheels.

19. In a gang plow, a traction member having driving means including a driving-shaft, a trailer secured to said member, said trailer having pivoted plows adjustable in a substantially vertical plane, and means for flexibly holding said plows, said holding means being adjustably controlled through said driving shaft.

20. In a gang plow, a traction member having driving means, a trailer secured to said member, said trailer having a plurality of vertically adjustable plows, and a common support adapted flexibly to hold said plows, said support being adjustably controlled through said driving means.

21. In a gang plow, a traction member having a driving shaft, a trailer secured to said member and having adjustable plows, and means for adjusting said plows, said means being operated from said driving shaft of said traction member.

22. In a gang plow, a traction member having a driving shaft, a trailer secured to said member and having plows adjustable in a substantially vertical direction, means operated from said driving shaft for raising said plows, and means for holding said plow in a raised position.

23. In a gang plow, a traction member having a driving shaft, a trailer secured to said member and having adjustable plows, a second shaft having means for adjusting said plows, means for holding said second shaft in a fixed position, and removable means for actuating said second shaft from said driving shaft.

24. In a gang plow, a traction member having a driving shaft and a second shaft, means for operatively connecting said shafts, a trailer hinged to said member and having plows pivoted thereto, and a flexible member secured to said plows and to said second shaft and adapted to control said plows through the movement of said second shaft.

25. In a gang plow, a traction member having a driving shaft and a second shaft, means for operatively connecting said shafts, a trailer hinged to said member and having plows pivoted thereto to swing in a substantially vertical plane, a flexible member secured to said plows and said second shaft and adapted to control said plows through the revolution of said second shaft, and means for holding said second shaft in a fixed poistion.

26. In a gang plow, a traction member having a driving shaft provided with a friction disk, and a second shaft provided with a friction disk, a friction pulley adapted to be removably placed in contact with said disks, a trailer secured to said member and having adjustable plows, and means for controlling said plows through the revolution of said second shaft.

27. In a gang plow, a traction member having a driving shaft provided with a friction disk, and a second shaft provided with a friction disk, a friction pulley adapted to be removably placed in contact with said disks, means for holding said pulley in engagement with said disks, means for holding said second shaft in a fixed position, a trailer secured to said member and having adjustable plows, and a flexible member secured to said second shaft and to said plows and adapted to adjust said plows through the revolution of said second shaft.

28. In a gang plow, a traction member having a driving shaft provided with a friction disk and a second shaft provided with a friction disk, a friction pulley adapted to be removably placed in contact with said disks, a trailer secured to said member and having plows pivoted thereto to swing in a vertical plane, means for raising said plows through the revolution of said second shaft, means for automatically releasing said pulley when said plows is raised, and means for holding said second shaft in a fixed position.

29. In a gang plow, a traction member having a driving shaft provided with a friction disk, and a second shaft provided with a friction disk, a ratchet, and a worm, a lever pivoted to said member and having a friction pulley adapted to be removably placed in contact with said disks, a pivoted block having a rack in engagement with said worm and adapted to hold said lever with said pulley in engagement with said disks, said block being adapted to be pivoted out of engagement with said lever through the revolution of said second shaft, a trailer secured to said member and having adjustable plows, means for adjusting said plows through the revolution of said second shaft, and a pawl adapted to engage with said ratchet to prevent said second shaft from revolving in one direction.

30. In a gang plow, a traction member having a driving shaft provided with a friction disk, and a second shaft provided with a friction disk, a ratchet, a worm, a lever pivoted to said member and having a friction pulley adapted to engage said friction disks, and a slidable pin, a block pivoted to said member and having a rack adapted to engage said worm, a groove adapted to receive said pin and a recess, said block being adapted to engage said pin to hold said lever with said pulley in engagement with said disks, said block being actuated by said second shaft to swing said recess under said pin whereby said pulley is disengaged from said disks, a pawl adapted to engage with said ratchet to prevent the revolution of said second shaft in one direction, a trailer secured to said member and having adjustable plows, and a flexible member secured to said plows and to said second shaft and adapted to control said plows through the revolution of said second shaft.

In testimony whereof we have signed our names to this specification in the presence of two subscribing witnesses.

AMON THOMPSON.
GEORGE P. LABEREE.

Witnesses to signature of Amon Thompson:
JAMES M. REEVES,
WILLIAM PENMAN.

Witnesses to Geo. P. Laberee's signature:
F. G. LABEREE,
P. L. FRAZIER.